United States Patent [19]

Gutierrez et al.

[11] Patent Number: 4,994,119

[45] Date of Patent: Feb. 19, 1991

[54] WATER SOLUBLE SOLDERING FLUX

[75] Inventors: Barbara L. Gutierrez, Austin; Janet Sickler, Georgetown, both of Tex.

[73] Assignee: International Business Machines Corporation, Armonk, N.Y.

[21] Appl. No.: 521,775

[22] Filed: May 9, 1990

[51] Int. Cl.⁵ .............................................. B23K 35/34
[52] U.S. Cl. ......................................... 148/23; 148/24; 148/25
[58] Field of Search ..................................... 148/23–25

[56] References Cited

U.S. PATENT DOCUMENTS

| | | | |
|---|---|---|---|
| 3,127,290 | 3/1964 | Konig | 148/23 |
| 3,925,112 | 12/1975 | Petersen, Sr. et al. | 148/25 |
| 3,944,123 | 3/1976 | Jacobs | 148/25 |
| 4,278,479 | 7/1981 | Anderson et al. | 148/23 |
| 4,441,938 | 4/1984 | Poliak et al. | 148/23 |
| 4,661,173 | 4/1987 | Barajas et al. | 148/24 |
| 4,701,224 | 10/1987 | Zado | 148/23 |
| 4,738,732 | 4/1988 | Anderson et al. | 148/23 |
| 4,752,027 | 6/1988 | Gschwend | 228/180.2 |

OTHER PUBLICATIONS

J. Lamoureux, C. Morand and B. Pottier, "Used Electronic Module Pin Solder Dress Process", *IBM Technical Disclosure Bulletin*, vol. 24, No. 10, Mar. 1982.

*Primary Examiner*—Peter D. Rosenberg
*Attorney, Agent, or Firm*—Charles D. Gunter, Jr.

[57] ABSTRACT

A water soluble soldering flux is shown which includes gum arabic, modified polysaccharides and other natural resins as the carrier, an organic activator and water. The carrier provides a tacky, yet fluid medium capable of holding precisely aligned electrical components during solder reflow and allows aqueous removal of the flux after reflow. The flux composition can be used to solder precisely aligned integrated circuit chips onto a circuit board.

14 Claims, No Drawings

WATER SOLUBLE SOLDERING FLUX

BACKGROUND OF THE INVENTION

1. Technical Field

The present invention relates to water soluble flux compositions and their use in processes for soldering members, particularly metallic members together. The flux compositions of the invention are particularly useful in the field of microelectronics, such as in the preparation of integrated circuit boards

2. Description of the Prior Art

A common task in the manufacture of microelectronic components involves the manufacture of single chip of multi-chip modules having input/output pins which are inserted into a substrate. The input/output pins provide the needed electrical connections to the integrated circuit chip or chips which are subsequently connected to the substrate or carrier. In other presently known manufacturing processes, a chip is soldered directly to a printed circuit board. With either process, solder flux compositions have typically been applied to the pins in order to connect the component to the selected substrate, for instance, the printed circuit board. Flux compositions are employed to remove oxides from the pins and to prevent the pins from oxidizing when subjected to elevated temperatures for soldering, thereby serving to maintain the electrical conductivity of the pins. Once the solder is applied, any flux composition or residue remaining on the pins and substrates must be removed to provide as clean a substrate as possible.

The soldering operation becomes increasingly difficult when applied to microelectronics. The pieces to be joined are extremely small, making cleaning, tinning, post cleaning and inspection difficult. In some cases, to avoid overheating, only the lead portion of the parts to be joined can be heated during the soldering operation. Cleaning and post cleaning are difficult due to the small size of the component, their large numbers, and the potential damage to the electronics by the cleaning solutions used. Another problem source results from the fact that many of the known soldering fluxes are corrosive. In the environment of microelectronics, corrosion from any residual flux can ruin an extremely costly device.

The provision of a non-toxic, non-corrosive soldering flux which is water cleanable holds many advantages for the microelectronics application. Although aqueous cleaning fluxes have been available in the past for use in solder fluxing prior to reflow, and in combination with pastes, these prior art compositions have not provided the desirable property of stickiness or tackiness needed to hold integrated circuit chips and other precisely placed components during reflow. Those prior art formulations which exhibited the desirable property of tackiness at room temperature generally exhibit large viscosity/fluidity end changes due to solder reflow temperatures. The solubility characteristics of the commercially available formulations in water has been less than optimum. This property is extremely important in microelectronic applications with low stand-off heights such as the 0.002-0.004 inch chip attach to substrate heights presently encountered.

As has been mentioned, many of the organic water soluble fluxes presently available contain corrosive materials such as halides. Very aggressive chemistry containing corrosive materials such as chlorides, bromides, strong bases such as triethanolamine, or easily ionized organic acids which produce a low pH aqueous solution, necessitates rapid and thorough flux removal after processing, before deterioration of circuitry and interconnections can occur. For instance, a flux composition which contains free halogen can result in conversion to hydroacids and corresponding halide ions by hydrolysis at the soldering temperature. Hydroacids can further react with organic materials present in the flux to free halide ions. Accordingly, if the flux residue is not entirely removed, it will lead to corrosion of the parts soldered.

Many of the commercially available low residue fluxes which we have tested have proved to be too thin, running out from under the chip during the manufacturing operation and failing to hold it in place.

The present invention has as its object to provide a water soluble soldering flux which possesses the required degree of tackiness to hold precisely aligned components during solder reflow.

Another object of the invention is to provide such a soldering flux which is environmentally superior, requiring no chemical reclamation or waste treatment.

Another object of the invention is to provide a soldering flux which provides the needed degree of oxide removal while forming relatively inert reaction products after reflow which do not necessitate immediate flux removal.

Another object is to provide a soldering flux having a tacky carrier medium which is completely water soluble, allowing it to be easily cleaned without the use of organic solvents.

Additional objects, features and advantages will be apparent in the written description which follows.

SUMMARY OF THE INVENTION

The water soluble soldering flux of the invention comprises a tacky, non-toxic water soluble polymer as a carrier to provide an appropriately tacky yet fluid medium for the flux, an organic activator composition, such as an aliphatic dicarboxylic acid and the remainder water. By combining these ingredients, a soldering flux is produced which remains tacky after application, holding a precisely aligned chip in position for reflow, and which is completely water soluble, allowing it to be easily cleaned without the use of organic solvents.

The method of the invention is used for fluxing the surface of a portion on a piece, such as the pin of an integrated circuit chip and/or the circuit pad on the substrate. The portion to be fluxed is contacted with the soldering flux of the invention which most preferably consists essentially of a mixture of nontoxic natural resin, such as gum arabic, as the carrier, an organic activator and water. The contacted portion is then heated to a temperature at which the organic activator reacts with oxides present on the surface of the portion of the piece to remove the oxides and form non-corrosive reaction products.

In joining the chip or a component to a substrate, such as a printed circuit board, either the pin(s) or pads or a selected area on the substrate are fluxed using the composition of the invention. The chip or component is then brought into contact with the substrate. The chip or component is then joined to the substrate using any of the commonly used soldering methods such as wave soldering, reflow soldering, hot gas, or conductive heating. If wave soldering is used, a metallic solder to form the joint is supplied by the molten wave of solder. If one of the other methods is used, at least one of the mating surfaces on the pins, chip, component, or substrate has sufficient solder predeposited. Commonly used techniques are plating, hot air deposition, solder leveling, dipping, or prior reflow of solder paste. After soldering, the assembly is cooled to a temperature below the melting point of the solder, thereby joining the contacted portions together.

DETAILED DESCRIPTION OF THE INVENTION

The water soluble soldering flux compositions of the invention comprise (1) from about 4 to about 40% by weight of a tacky, non-toxic water soluble polymer as a carrier; (2) from about 1 to 8% by weight of an organic activator of the type which reacts with oxides present on the surface to be fluxed; and (3) the remainder being water.

A number of natural and synthetic polymers can be used to form the flux carrier. Preferably, the tacky, non-toxic water soluble polymer used as the carrier of the invention is a tacky, non-toxic natural resin or gum. By way of example, the carrier can be selected from the group consisting of gum arabic, polysaccharides, substituted polysaccharides such as hydroxypropyl substituted polysaccharides, polyacrylamides, and the like.

The most preferred carrier is a filtered natural resin, gum arabic. This gum is a highly branched polymer of galactose, with rhamnose, arabinose and glucoronic acid as calcium, magnesium and potassium salts. It is soluble in cold or hot water and produces a viscous, sticky solution exhibiting minimal spreading when heated to reflow temperatures, with good stability under storage, and a pseudo plastic rheology that resists separation and enhances the application properties.

The *Merck Index*, Merck and Company, 6th Ed., 1952, page 4, states that gum arabic or acacia gum has a molecular weight of about 240,000 and a specific gravity of about 1.35 to 1.49. The moisture content usually varies from about 13 to 15%. Gum arabic is insoluble in alcohol but almost completely soluble in twice its weight of water. Gum arabic is commercially available from a number of sources.

The gum arabic component is preferably employed in the compositions of the present invention in amounts of about 4 to 40% by weight of the soldering flux composition, most preferably about 10-30% by weight of the total soldering flux composition.

The compositions of the present invention also contain an organic activator which is effective to remove oxides present on the surface to be fluxed and which improves wetting of the substrate. Preferably, the organic activator is ephemeral in nature, completely dissipating when heated in the range of about 200° C. and above. The known organic activators include, for example, aliphatic carboxylic acids having about 5 to 10 carbon atoms, e.g. adipic acid and citric acid. Other organic activators are referenced in the literature and include, for instance, salicylic acid, ethylene diamine tetracetic acid and/or diethylene triamine pentaacetic acid and/or sodium salts thereof.

A particularly preferred organic activator for the present purposes is adipic acid, $HOCO(CH_2)_4COOH$. Adipic acid is a white crystalline solid having a molecular weight of approximately 146.14, and a melting point of about 153° C. It is found naturally in beet juice and can be prepared by oxidizing cyclohexanol with concentrated nitric acid. It is commercially available from Aldrich Chemical Company, Inc., Sigma Chemical Company and Eastman Kodak Company, among other sources.

The organic activator component of the soldering flux of the invention is present in the range from about 1 to 10% by weight, preferably about 2 to 8%, by weight of the total flux composition.

The remainder of the soldering flux of the invention is preferably deionized water. An organic solvent or diluent is not utilized, thereby contributing to the non-toxic, environmentally preferred characteristics of the inventive compositions. As shown in the following examples, a surfactant such as an acetylenic diol can be included in some formulations. The water component will preferably be present in the range from about 60 to 90% by weight, preferably about 62 to 88% by weight of the total flux composition.

The following non-limiting example is intended to further illustrate the present invention:

EXAMPLE I

A soldering flux of the invention was prepared by mixing 45 milliliters of deionized water, 6 grams of gum arabic and approximately 2 grams of adipic acid. The formulation was accomplished by first mixing the gum arabic and water and then adding the organic acid. Heating is necessary to effect complete solution. The gum arabic carrier provided a tacky yet fluid medium which held precisely aligned chips in place during reflow. The residue was easily cleaned with water and left no corrosive residue.

Preferred formulations of the aqueous flux with gum arabic as the carrier include:

| (1) | Weight percent | Chemical |
|---|---|---|
| | 10-30 | Gum acacia |
| | 2-8 | Adipic acid/ citric acid |
| | 62-88 | Deionized water |
| (2) | Weight percent | Chemical |
| | 10-30 | Gum acacia |
| | 2-5 | EDTA |
| | 65-88 | Deionized water |

Both of these formulations hold the organic activator in a suspension.

Additional formulations which utilize other carriers are as follows:

| (3) | Weight percent | Chemical |
|---|---|---|
| | 5 | Polysaccharide C3-443 (A.E. Staley) |
| | 2-5 | Adipic acid |
| | 2 | 2,4,7,9-tetramethyl-5-decyne-4,7 diol |
| | balance | Deionized water |
| (4) | Weight percent | Chemical |
| | 4.5 | Polysaccharide C3-455 (A.E. Staley) |
| | 2-5 | Adipic acid |
| | 2 | 2,4,7,9-tetramethyl-5-decyne-4,7 diol |
| | balance | Deionized water |

Formulation No. 3 is a semi-solid gel which does not spread when heated, thus limiting chip movement during solder reflow/chip attach. The acetylenic diol serves to decrease the surface tension of the gel and allows the deionized water to evaporate without splattering the flux. The controlled evaporation of water also limits chip movement during the attachment process.

Formulation No. 4 has same properties except that it is a liquid suspension.

Formulation No. 3 has the potential advantage of being screenable onto a circuit board card. In cases where a liquid physical state is preferred, Formulation No. 4 can be utilized. Formulations 3 and 4 differ from Formulations 1 and 2 only in the polysaccharide structure and how it is solvated in water.

An invention has been provided with several advantages. The soldering flux of the invention possesses the desired degree of tackiness needed to hold precisely aligned integrated circuit chips onto a circuit board. The flux composition is provided as a water soluble medium which allows aqueous removal of the flux after reflow. Because the flux can be easily cleaned without the use of organic solvents, a low toxicity flux is provided. Because corrosive materials such as chlorides, bromides, strong bases or easily ionized organic acids are not utilized, rapid and thorough flux removal after processing is not necessary. The flux compositions of the invention also prevent deterioration of circuitry and interconnections of the type produced by corrosive flux components. The flux composition is made from natural products and their derivatives as well as utilizing low acidity, non-corrosive activation.

While the invention has been shown and described with reference to a preferred embodiment it will be understood by those skilled in the art that various changes in form and detail may be made therein without departing from the spirit and scope of the invention.

We claim:

1. A water soluble soldering flux adapted for use in assembling chips to integrated circuit boards where the stand-off height of the chips to the boards is on the order of about 0.002 inches to 0.004 inches, the flux comprising:
   from about 4 to about 40% by weight of a tacky, non-toxic water soluble polymer as a carrier, the non-toxic water soluble polymer comprising a naturally occuring resin:
   from about 2 to about 8% by weight of an organic activator;
   the remainder being water; and
   wherein the flux is characterized by the absence of halogen and rosin components and is completely soluble in water, allowing it to be cleaned from the integrated circuit board without the use of organic solvents.

2. A water soluble soldering flux adapted for use in assembling chips to integrated circuit boards where the stand-off height of the chips to the boards is on the order of about 0.002 inches to 0.004 inches, the flux comprising:
   from about 4 to about 40% by weight of a tacky, non-toxic water soluble polymer as a carrier, wherein the non-toxic water soluble polymer is a substituted polysaccharide;
   from about 2 to 8% by weight of an organic activator;
   the remainder being water; and
   wherein the flux is characterized by the absence of halogen and rosin components and is completely soluble in water, allowing it to be cleaned from the integrated circuit board without the use of organic solvents.

3. The water soluble soldering flux of claim 1, wherein the naturally occurring resin is gum arabic.

4. The water soluble flux of claim 1, wherein the organic activator is an aliphatic carboxylic acid having about 5 to 10 carbon atoms.

5. The water soluble flux of claim 4, wherein the organic activator is selected from the group consisting of:
   citric acid and adipic acid.

6. The water soluble flux of claim 1, wherein the organic activator is salicylic acid.

7. A water soluble soldering flux adapted for use in assembling chips to integrated circuit boards where the stand-off height of the chips to the boards is on the order of about 0.002 inches to 0.004 inches, the flux consisting essentially of:
   from about 10 to about 30% by weight gum arabic as a carrier;
   from about 2 to 8% by weight of adipic acid as an organic activator;
   the remainder being water; and
   wherein the flux is characterized by the absence of halogen and rosin components and is completely soluble in water, allowing it to be cleaned from the integrated circuit board without the use of organic solvents.

8. A method for fluxing the surface of a portion on a piece, comprising the steps of:
   furnishing a piece to be fluxed;
   contacting the portion to be fluxed with a solution consisting essentially of a mixture of gum arabic as a carrier, an organic activator and water, the gum arabic being present in an amount sufficient to form a tacky solution capable of fixing the piece in a predetermined position; and
   heating the contacted portion to a temperature at which the organic activator reacts with oxides present on the surface; and
   washing away any residue with water.

9. The method of claim 8, wherein the organic activator employed is an aliphatic carboxylic acid having about 5 to 10 carbon atoms.

10. The method of claim 9, wherein the organic activator employed is selected from the group consisting of:
    citric acid and adipic acid.

11. The method of claim 8, wherein the organic activator is selected from the group consisting of salicylic acid, ethylene diamine tetraacetic acid and diethylene triamine pentaacetic acid.

12. A method for joining portions of two pieces, comprising the steps of:
    furnishing the two pieces to be joined;
    contacting the portions to be joined with a solution consisting essentially of gum arabic as a carrier, an aliphatic dicarboxylic acid activator and the remainder water;
    applying a metallic solder to at least one of the portions to be joined to tin the portion; and
    contacting the two portions to be joined and bringing them to a temperature above the melting point of the metallic solder and then cooling the contacted portions to a temperature below the melting point of the metallic solder, thereby joining the contacted portions together;
    washing the joined portions with water to remove any residue present.

13. The method of claim 12, wherein at least one of the pieces is an electronic component.

14. The method of claim 13, wherein one of said pieces is an electronic chip and one of said pieces is a printed circuit board.

* * * * *